UNITED STATES PATENT OFFICE.

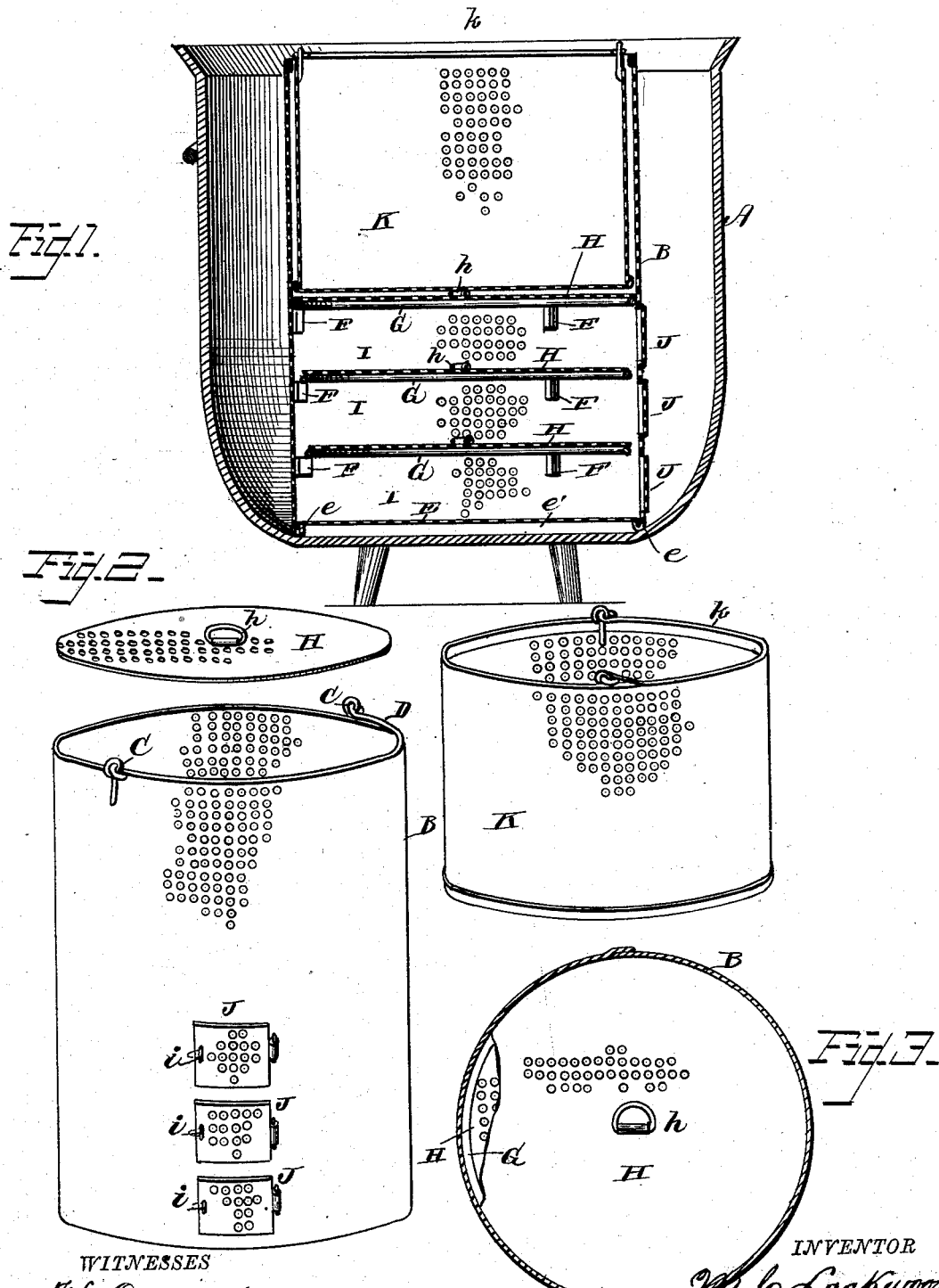

MORRIS C. LOCKWOOD, OF VINELAND, NEW JERSEY.

COOKING-UTENSIL.

SPECIFICATION forming part of Letters Patent No. 282,542, dated August 7, 1883.

Application filed June 2, 1883. (No model.)

*To all whom it may concern:*

Be it known that I, MORRIS C. LOCKWOOD, a citizen of the United States, residing at Vineland, in the county of Cumberland and State of New Jersey, have invented a new and useful Cooking-Utensil, of which the following is a specification, reference being had to the accompanying drawings.

This invention relates to culinary or cooking utensils; and it has for its object to provide means whereby the cooking can be done with greater efficiency and with less trouble than heretofore.

It consists in certain novel combinations and arrangements of parts, as hereinafter set forth and claimed.

In the accompanying drawings, Figure 1 is a sectional view of my improved utensil inclosed within a common cooking-vessel. Fig. 2 is a detail view of the various parts comprising my utensil, and Fig. 3 is a sectional view through the partition-plate.

Like letters refer to corresponding parts in all the figures.

Referring to the drawings, A designates a common cooking-pot of ordinary construction.

B designates my improved cooking-utensil, constructed of foraminous sheet metal, and provided with eyes C, in which is secured a handle, D. The bottom E of the utensil is secured to the sides thereof, about an inch from the bottom edge of said sides, so that a projecting circular flange, e, will be formed, on which the utensil rests. As shown, the raised bottom E affords a space, e', within the circular flange e, and thus the bottom E will not come in contact with the bottom of the pot A, so that the vegetables resting on said bottom E will not be burned.

F designates metallic brackets secured at intervals around the inside of the utensil, and resting on said brackets is a ring, G, which is secured to the top thereof. The brackets F decrease in size from the bottom upward, while the rings and partition-plates increase in size. The object of this construction is apparent. Since the smallest rings are at the bottom of the utensil B, said rings will require a larger projecting bracket to support them, and as the rings increase in size the projecting portions of the brackets are diminished. The partition-plates increase in size in proportion to the increasing diameter of the rings, so that the withdrawal of the partition-plates may be effected. If the rings were the same size as the partition-plates, this withdrawal could not be done, and thus the efficiency and advantages of the utensil would be impaired.

H designates perforated sheet-metal partition-plates increasing in size to correspond to the increasing diameter of the rings and placed on the rings and brackets, and provided with loops $h$, secured to the top of the partition-plates, said loops serving as a means for withdrawing the plates whenever necessary. As shown, the partition-plates H divide the utensil B into separate cooking-compartments I, in which different articles can be cooked at the same time. Thus potatoes can be cooked in one compartment, while peas or eggs can be cooked in the other compartment. Any number of these compartments may be provided by adding additional partition-plates, and by withdrawing all of said plates the utensil B may be used to cook a large quantity of any one article.

J designates doors formed in the sides of said utensil and communicating with each compartment I, and provided with latches $i$, to hold the doors locked when cooking is going on. Sliding doors may be substituted for the swinging doors shown, and when the former are used the latches can be dispensed with. The doors permit access to any one of the compartments, and thus fresh articles can be supplied and withdrawn, as desired.

K designates an inner pail constructed of foraminous sheet metal, and having a suitable handle, $k$. This pail is placed in the upper compartment, I, resting on the partition-plate H, and can be withdrawn and used for cooking purposes independent of the utensil B.

The operation of my invention can be readily understood from the foregoing description, taken in connection with the annexed drawings. The utensil B is placed within the pot A, which is filled with water nearly above the second compartment I. Before, however, placing the utensil within the pot, the articles to be cooked are inserted through the doors J into the two lower compartments. The pot A is then placed on the fire to boil, and thus the boiling of the water will cook the contents of utensil B. The pail K is then filled with articles desired to be steamed. As seen, the arising vapor from the boiling water below the pail K will readily steam the contents of said pail. By this means boiling can be conducted in the two compartments below the pail, while the contents of the pail will be steamed at the same time. If it is desired to cook the contents of pail K, more water is added to the pot A, so as to bring the water-line over and above the contents of said pail. Thus the articles within the pail can be cooked or steamed as desired.

As stated, the pail K can be used for culinary purposes independent of the utensil B, and the various uses which I may make of it need not be specifically mentioned here.

My device is simple, inexpensive, and durable, and works with admirable efficiency.

It is obvious that my utensil can be used as a flour-sieve, or as a fruit-strainer in preserving or making jelly.

Having described my invention, I claim—

1. The cooking-utensil provided with the brackets F, ring G, and partition-plates H, having loop $h$, said plates separating the utensil into compartments I, each of which is provided with a door communicating therewith, for the purpose set forth.

2. In a cooking-utensil, the utensil B, provided with the brackets F and ring G, in combination with the partition-plates H, having loop $h$, forming compartments I, doors J, communicating with each of said compartments, and a pail, K, placed in the upper compartment, for the purpose set forth.

In testimony that I claim the foregoing as my own I have hereto affixed my signature in presence of two witnesses.

M. C. LOCKWOOD.

Witnesses:
 JOHN JEWELL,
 A. S. BROWN.